United States Patent [19]

Garapon et al.

[11] Patent Number: 5,104,842
[45] Date of Patent: Apr. 14, 1992

[54] CATALYTIC COMPOSITION COMPRISING TITANIUM AND PHOSPHOROUS, ITS PREPERATION AND ITS USE FOR CONDENSING AN EPOXIDE ON A CARBOXYLIC ACID ANHYDRIDE

[75] Inventors: Jacques Garapon, Lyons; Isabelle Muller, Serezin du Rhone; Rémi Touet, Saint Egreve; Catherine Huet, Chalon sur Saone; Bernard Damin, Oullins, all of France

[73] Assignees: Institut Francais du Petrol, Rueil Malmaison; L'Air Liquide Societe Anonyme pour l'Etude et l'Exploitation des Procedes Georges Claude, Paris; Elf France, Courbevoie, all of France

[21] Appl. No.: 598,285

[22] Filed: Oct. 16, 1990

[30] Foreign Application Priority Data

Oct. 17, 1989 [FR] France ............................ 89 13658

[51] Int. Cl.$^5$ ............................................ B01J 31/12
[52] U.S. Cl. ................................. 502/164; 502/171
[58] Field of Search ........................... 502/164, 171

[56] References Cited

U.S. PATENT DOCUMENTS 3,056,818 10/1962 Werber ............................ 260/410.6
3,664,966 5/1972 Gordon ............................ 252/430
4,436,838 3/1984 Lin ................................... 502/164
4,506,091 3/1985 Deardorff ........................ 502/171

FOREIGN PATENT DOCUMENTS 0230983 8/1987 European Pat. Off. .

Primary Examiner—Patrick P. Garvin
Assistant Examiner—Brent M. Peebles
Attorney, Agent, or Firm—Millen, White & Zelano

[57] ABSTRACT

The object of the invention is a catalytic composition comprising titanium and phosphorus and resulting from the contacting of at least one titanate with at least one quaternary "onium" salt of an acid selected from the group consisting of phosphoric acid and the phosphonic acids of formula $R^7H_2PO_3$ in which $R^7$ is a hydrocarbon group having 1 to 38 atoms of carbon and the "onium" remainder is a remainder of formula $(R^8R^9R^{10}R^{11}M)+$ in which M is an element from the group VA of the periodic table of elements, preferably nitrogen or phosphorous, and $R^8$, $R^9$, $R^{10}$ and $R^{11}$, identical or different, represent each an atom of hydrogen or a hydrocarbon group having 1 to 38 atoms of carbon.

This catalytic composition is utilizable for producing asters and polyesters from epoxides and carboxylic acid anhydrides.

8 Claims, 4 Drawing Sheets

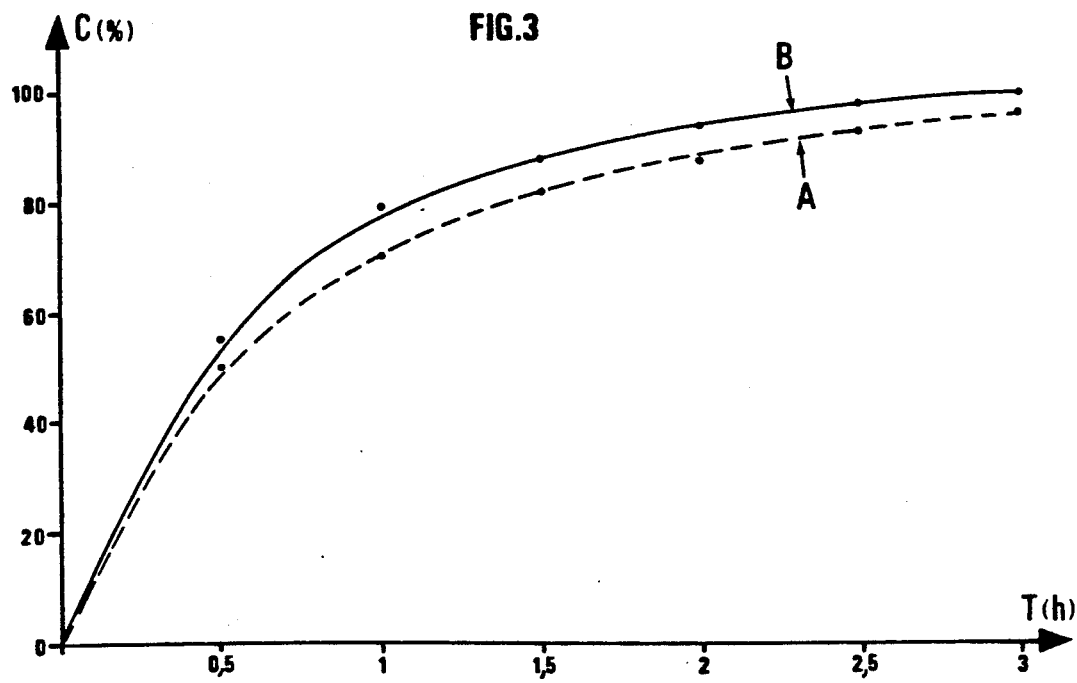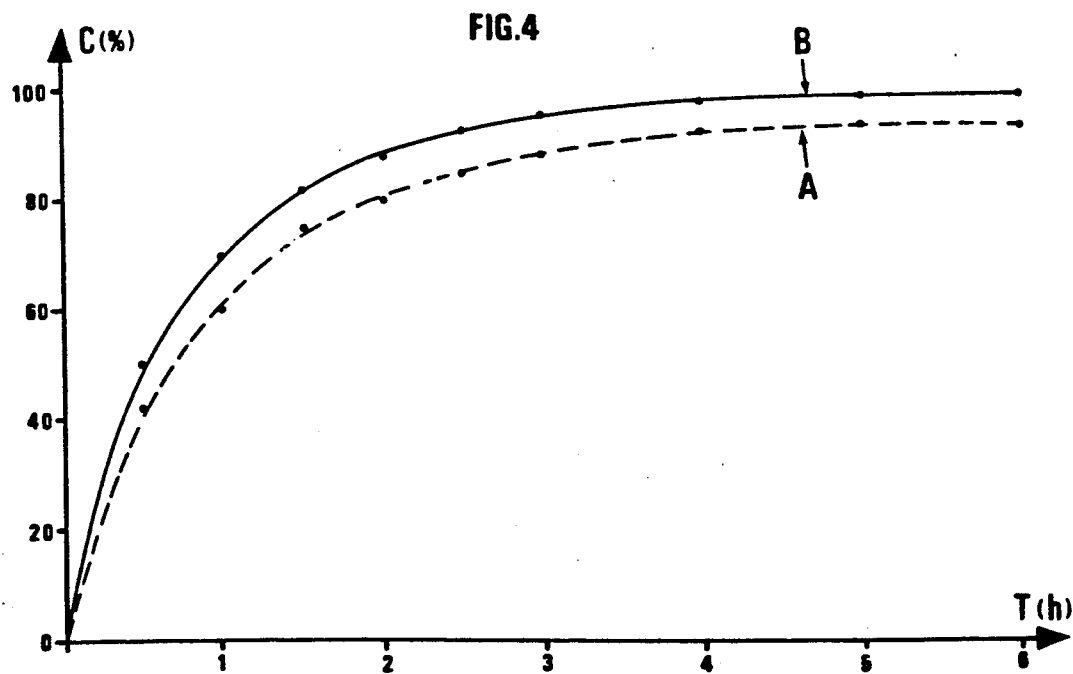

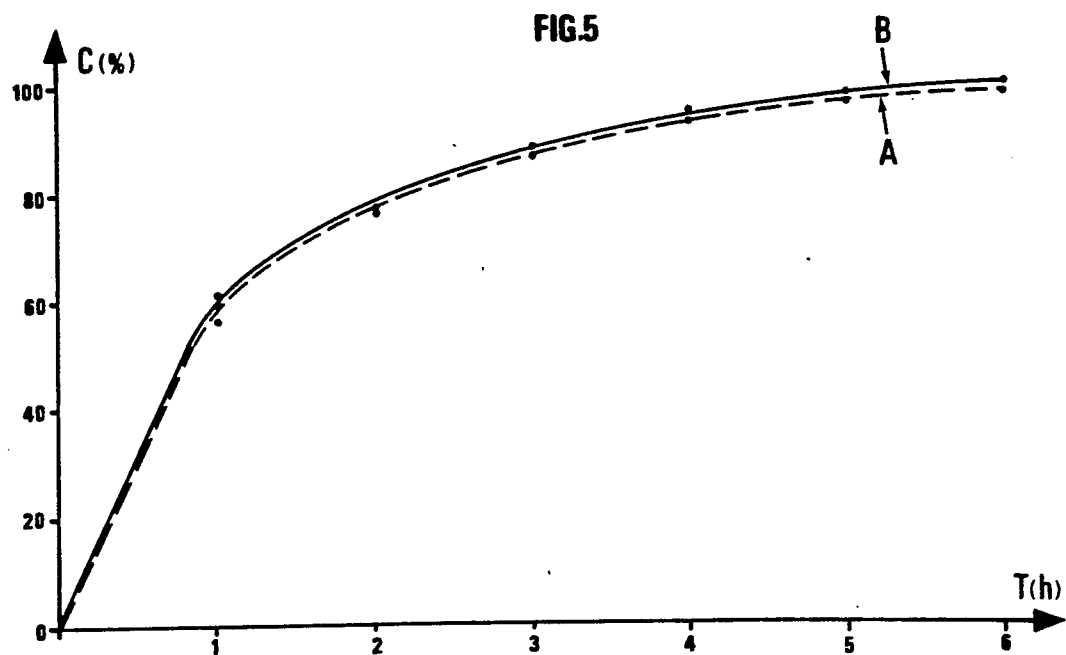
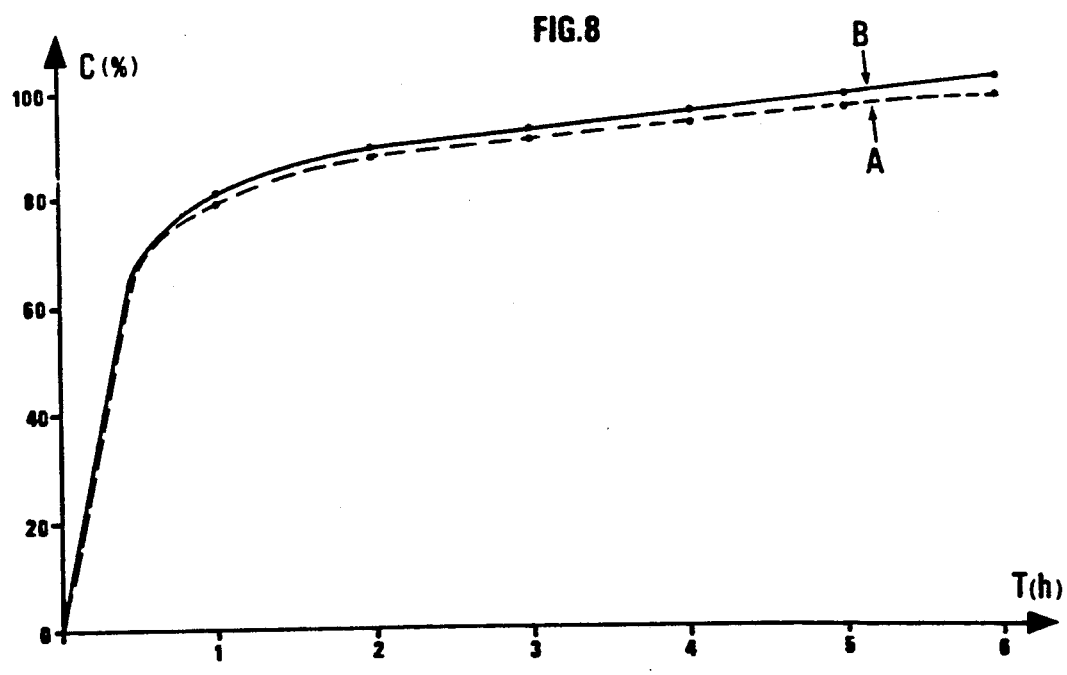

CATALYTIC COMPOSITION COMPRISING TITANIUM AND PHOSPHOROUS, ITS PREPERATION AND ITS USE FOR CONDENSING AN EPOXIDE ON A CARBOXYLIC ACID ANHYDRIDE

BACKGROUND OF THE INVENTION

The present invention relates to a catalytic composition comprising titanium and phosphorus, its preparation and its use notably as an esterification catalyst of at least one epoxide by at least one carboxylic acid anhydride.

The present invention particularly relates to the production of esters from at least one epoxide and at least one carboxylic acid anhydride, for example a monocarboxylic acid anhydride.

It also relates to the production of a condensation copolymer or polyester with a regular alternation of each type of compounds reacted and resulting from the condensation of at least one epoxide on at least one cyclic anhydride of a dicarboxylic acid.

This type of esterification or polyesterification is different from the conventional process which employs a dihydroxyl compound (or diol) and an anhydride or a carboxylic acid, notably in that the reaction involves the opening of the oxirane ring and in that no volatile matter is generated during the reaction. It is also different in that the reaction temperature does usually not exceed 150° to 200° C.

Numerous works have been published on the synthesis of esters and more particularly of polyesters from epoxides and anhydrides of carboxylic acids in the presence of catalysts of different types. These works show that one major problem encountered during the reaction of the epoxide on the anhydride in order to obtain an ester or a polyester is linked with the homopolymerization of epoxide.

In the case of the condensation between an epoxide (or epoxide derivative) and a cyclic anhydride of a dicarboxylic acid, these works are for example summarized by LUSTON and VASS (Advances in Polymer Sciences 1984, Vol. 56, p.91 and following pages) or by ISHII and SAKAI (Ring opening polymerisation, p.13 and following pages, published by K. C. FRISCH and S. L. REEGEN, MARCEL DEKKER 1969).

In the case of the reaction of an epoxide on a dicarboxylic acid anhydride in order to produce an alternate polyester, the homopolymerization of the epoxide leads to the obtaining of a sequenced polyether-polyester or to mixtures of polymers, in particular when LEWIS acids ($TiCl_4$, $BF_3$, are used as condensation catalysts. In order to overcome this drawback, it has been suggested, in prior art, to utilize anionic or coordination catalysts.

FISCHER (Journal of Polymer Science 1960, Vol. 44, p.155 and following pages) has shown that the use of a tertiary amine as the condensation catalyst of an anhydride on an epoxide allows obtained an alternate condensation. Still, this type of catalyst is ineffective in the case of maleic anhydride, probably because of the complex side reactions with the amines at the level of the double maleic bond. Other types of anionic catalysts such as the salts of alkaline metals or the tetra-alkylammonium salts have also been utilized.

For example, WADILL, MILLIGAN and PEPELL (Industrial and Engineering Chemistry, Product Research and Development 1964, Vol.3 Part 1, p.53 and following pages) describe the use of lithium chloride in the presence of protonic substances at 150° C. These authors suggest that the homopolymerization of epoxide represents part of their process. As an example of coordination catalysts, the dialkylzinc mentioned by INOUE et al. (Makromoleculare Chemie 1969, Vol.126, p.250 and following pages) can be cited; in fact, this type of coordination catalyst is only applicable, according to INOUE et al., to phthalic anhydride.

Other catalysts, based on transition metals, have also been described before. FISCHER (cited above) thus observes a partial homopolymerization of glycidic epoxide during its polycondensation with phthalic anhydride in the presence of tetrabutyl titanate.

U.S. Pat. No. 3,546,176 describes the use of tetrabutyl anhydride for producing unsaturated polyesters from anhydrides of unsaturated acids and epoxides. Nevertheless, as confirmed by a test performed by the applicant and described hereafter, this catalyst does not allow obtaining, with a sufficient reaction velocity (a velocity which requires a relatively high temperature), a polymer with a good alternation of the units stemming from the anhydride and the epoxide.

SUMMARY OF THE INVENTION

One problem which the present invention aims to solve is the obtaining of an ester or a polyester at a low temperature while having a very high reaction velocity and a considerable conversion of each one of the reagents utilized in this synthesis.

Another problem which the present invention aims to solve is the maximum limiting of the homopolymerization of the epoxide.

Another problem which the present invention aims to solve is the use of a condensation catalyst utilizable with an anhydride such as maleic anhydride as well as with an anhydride such as phthalic anhydride, in order to obtain perfectly alternated polyesters.

Another problem which the present invention aims to solve is the use of a condensation catalyst utilizable with an internal epoxide, that is to say an epoxide in which each atom of carbon of the oxirane ring has at least one substituent other than an atom of hydrogen, as well as with a terminal epoxide, that is to say an epoxide in which at least one of the atoms of carbon of the oxirane ring has two atoms of hydrogen.

DETAILED DESCRIPTION OF THE INVENTION

Figure 1:
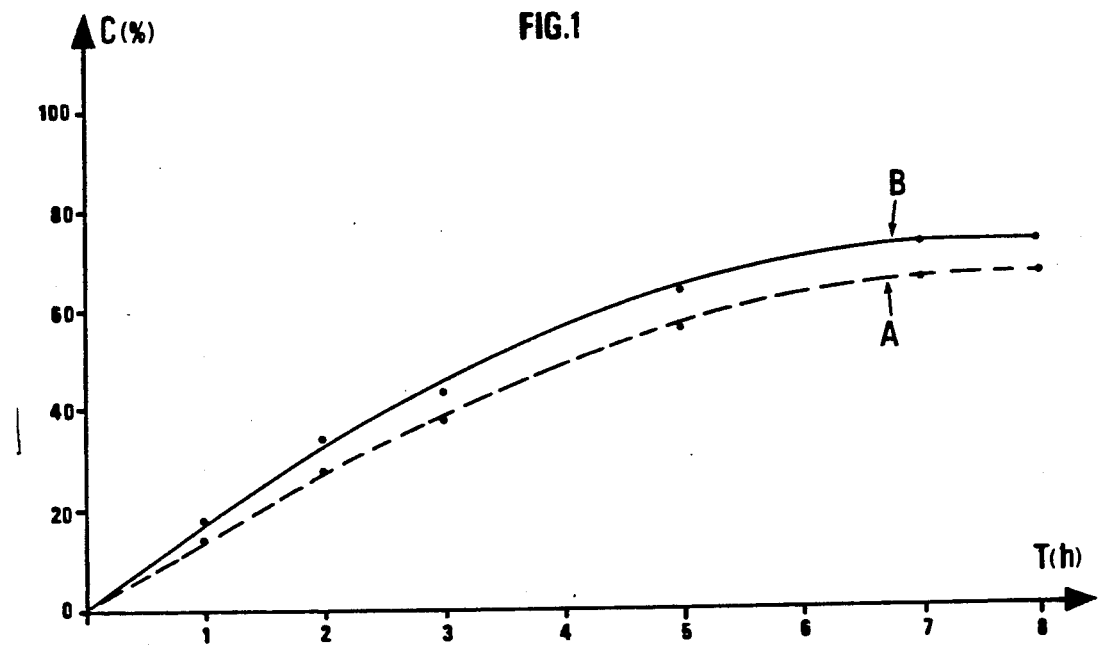

More precisely, the present invention relates to a catalytic composition comprising titanium and phosphorus and resulting from the contacting of at least one titanate of general formula (I) :

$$Ti(OR)_4 \qquad (I)$$

in which each one of the R groups independantly usually represents a hydrocarbon group having 1 to 10 atoms of carbon, preferably 1 to 6 atoms of carbon and most often 1 to 4 atoms of carbon, with at least one quaternary "onium" salt of an acid selected from the group consisting of the phosphoric acid of formula $H_3PO_4$ and the phosphonic acids of general formula (II) :

$$R^7H_2PO_3 \qquad (II)$$

in which $R^7$ is generally a hydrocarbon group having 1 to 38 atoms of carbon, preferably 4 to 24 atoms of carbon. Usually, the $R^7$ group is an aliphatic group. The phosphonic acids that are preferably used are those in which the $R^7$ group is an alkyl group, linear or branched.

The quaternary "onium" remainder is a remainder that is well-known by the man skilled in the art of general formula (III):

$$(R^8R^9R^{10}R^{11}M)^+ \qquad (III)$$

in which M is usually an element from group VA of the periodic table of elements (Handbook of Chemistry and Physics, 68th ed., 1987–1988) and preferably nitrogen or phosphorus; $R^8$, $R^9$, $R^{10}$, $R^{11}$ identical or different, usually represent each an atom of hydrogen or a hydrocarbon group, possibly substituted by a hydroxyl group, having 1 to 38 atoms of carbon and most often 1 to 24 atoms of carbon. The $R^8$, $R^9$, $R^{10}$, $R^{11}$ groups are preferably alkyl, hydroxyalkyl, aryl or aralkyl groups. The quaternary "onium" remainder that is preferably utilized is a remainder of general formula (III) in which the sum of the atoms of carbon of the $R^8$, $R^9$, $R^{10}$, $R^{11}$ groups ranges from 4 to 80 and most often from 7 to 44. The following non limitative examples of quaternary "onium" remainders (ammonium and phosphonium) can be cited: tetramethylonium, tetraethylonium, tetrapropylonium, tetrabutylonium, tetraphenylonium, tetrabenzylonium, methyltributylonium, methyltriethylonium, methyltriphenylonium, butyltriphenylonium, ethyltriphenylonium, benzyltrimethylonium, benzyltributylonium, benzyltriphenylonium, phenyltrimethylonium, octadecyltrimethylonium, naphtyltrimethylonium, tolyltrimethylonium, dimethyldioctadecylonium, dimethyldihexadecylonium, dioctadecylhydroxyethylmethylonium, dioctadecylhydroxypropylmethylonium and tricaprylylmethylonium ($C_8$ and $C_{10}$ mixture with predominance of $C_8$, known as ALIQUAT 336(R)) remainders.

The quaternary "onium" salt that is utilized derives, as far as the formal viewpoint is concerned, from the replacing of one or several protons of the phosphoric acid or of the phosphonic acids of the $R^7H_2PO_3$ type by a quaternary "onium" remainder, defined above, of general formula (III). This quaternary "onium" salt may has in its molecule 2, 3 or 4 atoms of group VA according to the number of salified acid functions and to the acid that is used. "Onium" salts comprising 2 or 3 atoms of group VA in their molecule are most often utilized.

Among the titanates of general formula (I), those which are preferably used are those in which each one of the R groups independantly represents an alkyl group, linear or branched, for example a lower alkyl group having 1 to 4 atoms of carbon such as methyl, ethyl, n-propyl, isopropyl, n-butyl, isobutyl, tertiobutyl and 1-methyl propyl.

Usually, the amount of titanate contacted with the quaternary "onium" salt of phosphoric or phosphonic acid used is such that the molar ratio titanate/quaternary "onium" salt ranges from about 0.5:1 to about 2:1 and preferably from about 0.8:1 to about 1.25:1.

The catalytic composition of the present invention is usually obtained by contacting the titanate and the "onium" salt in a liquid medium which is preferably an organic liquid and most often a hydrocarbon compound or a mixture of hydrocarbon compounds. The liquid medium used is advantageously the solvent that is intended to be utilized during the esterification or polyesterification reaction. This contacting is usually achieved at a temperature ranging from about 0° to about 100° C., most often from about 10° to about 80° C., and preferably from about 15° to about 30° C. The contacting will be advantageously carried out at the room temperature (15° to 25° C). The duration of the contacting between the titanate and the "onium" salt generally ranges from about 1 to about 60 minutes, and most often from about 1 to about 30 minutes. This contacting is most often achieved at the atmospheric pressure, but it can also be performed with a pressure higher or lower than the atmospheric pressure.

It is not imperative to operate under an inert atmosphere, but the contacting will be carried out most often under an inert atmosphere of nitrogen or argon for example.

The object of the invention is also the use of the catalytic composition defined above as an esterification or polyesterification catalyst of at least one epoxide by at least one carboxylic acid anhydride.

The carboxylic acid anhydride that is usually utilized is a monocarboxylic acid anhydride or a dicarboxylic acid anhydride.

The monocarboxylic acid anhydrides which are possibly used are notably those derived from the monocarboxylic acids of general formula $R^{12}COOH$ in which $R^{12}$ represents an organic group, preferably a hydrocarbon group having usually 1 to 160 atoms of carbon and most often 2 to 90 atoms of carbon; this group can be possibly substituted by at least one hetero-atom or at least one hetero-atomic group. As an example of heteroatoms, halogens and particularly chlorine and bromine can be cited, and, as an example of hetero-atomic groups, the oxo and the alkoxy groups can be cited. The $R^{12}$ group is most often an aliphatic group, for example an alkyl or alkylene group, linear or branched, or a cyclo-aliphatic group, or an aralphatic group, for example an aryl-alkyl (aralkyl) group or an alkyl-aryl (alkaryl) group or an aryl group. The anhydride which is used can be an anhydride derived from only one monocarboxylic acid (anhydride known as symmetric) or an anhydride derived from two different monocarboxylic acids (known as mixed anhydride).

The cyclic anhydride of a dicarboxylic acid that can be utilized in the present invention is preferably an anhydride of a vicinal dicarboxylic acid. This vicinal dicarboxylic acid is usually selected from the aliphatic or cyclo-aliphatic acids, saturated or unsaturated, most often unsaturated, and from the acids having one aromatic ring in their molecule. The cyclic anhydride that is utilized usually has 4 to 160 atoms of carbon and most often 4 to 90 atoms of carbon in its molecule.

As non limitative examples of carboxylic acid anhydrides, the anhydrides derived from one or two of the following acids can be cited formic acid, acetic acid, propanoic acid, the butanoic acids such as butyric acid and isobutyric acid, the pentanoic acids such as valeric acid, isovaleric acid and pivalic acid, the hexanoic acids such as caproic acid and 2-methyl pentanoic acid, the heptanoic acids such as enanthic acid, the octanoic acids such as caprylic acid, iso-octanoic acid and 2-ethyl hexanoic acid, the nonanoic acids such as isononanoic acid and pelargonic acid, the decanoic acids such as capric acid, isodecanoic acid and neodecanoic acid, the dodecanoic acids such as lauric acid, the tetradecanoic acids such as myristic acid, the hexadecanoic acids such as palmitic acid, the octadecanoic acids such as stearic acid, the eicosanoic acids, the docosanoic acids such as behenic acid, the tetracosanoic acids, the hexacosanoic acids such as cerotic acid, acrylic acid, methacrylic acid, crotonic acid, isocrotonic acid, angelic acid, tiglic acid, sorbic acid, the decylenic acids, the undecylenic acids, the dodecylenic acids, palmitoleic acid, C18-unsaturate acids such as oleic acid, linoleic acid and linolenic acid, gadoleic acid, arachidonic acid, erucic acid, the mono-, di- and tri-chloroacetic acids, 2-chloro propanoic acid, 2,2-dichloro propanoic acid, cyclohexanecarboxylic acid, benzoic acid, cinnamic acid, 2-phenyl propanoic acid, 4-methoxy benzoic acid and toluic acid.

The following non limitative examples of cyclic anhydrides of dicarboxylic acids can be cited maleic anhydride, the alkylmaleic anhydrides such as for example citraconic or methylmaleic anhydride, the halogenomaleic anhydrides such as for example the chloro- and bromo-maleic anhydrides, succinic anhydride, the alkenylsuccinic anhydrides such as for example itaconic or methylene-succinic anhydride, n-octadecenylsuccinic anhydride and dodecenylsuccinic anhydride, the polyalkenylsuccinic anhydrides having usually an average molecular mass of about 200 to 3,000 and, most often, of about 250 to 2,000 (such as for example the polypropenylsuccinic anhydrides, particularly tetrapropenylsuccinic anhydride, and the polyisobutenylsuccinic anhydrides often called PIBSA), phthalic anhydride, the phthalic anhydrides substituted by at least one atom of halogen and/or by at least one alkyl group, for example a lower alkyl group having 1 to 4 atoms of carbon, esterified trimellitic anhydride, 1,2-cyclohexanedicarboxylic anhydride, the 1,2-cyclohexanedicarboxylic anhydrides substituted by at least one atom of halogen and/or by at least one alkyl group, for example a lower alkyl group having 1 to 4 atoms of carbon, nadic or [2,2,1]bicyclo 5-heptene 2,3-dicarboxylic anhydride and the nadic anhydrides substituted by at least one atom of halogen and/or by at least one alkyl group, for example a lower alkyl group having 1 to 4 atoms of carbon.

The following examples of cyclic anhydride of a non vicinal dicarboxylic acid can also be cited glutaric anhydride, the glutaric anhydrides substituted by at least one atom of halogen and/or by at least one alkyl group, for example a lower alkyl group having 1 to 4 atoms of carbon, glutaconic anhydride and the glutaconic anhydrides substituted by at least one atom of halogen and/or by at least one alkyl group, for example a lower alkyl group having 1 to 4 atoms of carbon.

The epoxide compound used within the scope of the present invention is a compound having usually 2 to 62 atoms of carbon, preferably 2 to 40 atoms of carbon and most often 6 to 36 atoms of carbon in its molecule. This epoxide compound is usually either an internal epoxide or a terminal epoxide.

Mono-epoxide compounds are preferably used within the scope of the present invention. It is nevertheless also possible to utilize poly-epoxide compounds comprising several epoxide groups (oxirane rings) in their molecules, for example 2 or 3 epoxide groups. It is also possible to use mixtures of epoxide compounds comprising mono-epoxide compounds and poly-epoxide compounds. In the case of a condensation of at least one cyclic anhydride of a dicarboxylic acid on a mixture of epoxide compounds comprising poly-epoxide compounds in order to produce a polymer, mixtures usually comprising a proportion of at least 80%, preferably at least 90% and, for example, at least 95% by mole of mono-epoxide compounds will be used; the molar proportion of poly-epoxide compounds in the mixture represents the 100% complement.

The epoxide that is utilized in the present invention is most often a mono-epoxide compound corresponding to the general formula (IV):

in which:

$R^1$ and $R^3$, identical or different, represent each an atom of hydrogen or a lower alkyl group having 1 to 4 atoms of carbon such as defined above;

$R^2$ and $R^4$, identical or different, represent each an atom of hydrogen, a hydrocarbon group, possibly substituted by at least one atom of halogen (chlorine, bromine, fluorine or iodine), having 1 to 60 atoms of carbon (such as, for example, an alkyl group, linear or branched, and preferably substantially linear, having 1 to 60 atoms of carbon, preferably 1 to 38 atoms of carbon and, most often, 4 to 34 atoms of carbon, an alkenyl group, linear or branched, preferably substantially linear, comprising one or several double bonds and having 2 to 60 atoms of carbon, preferably 2 to 38 atoms of carbon and, most often, 4 to 34 atoms of carbon, a cyclo-aliphatic group having 3 to 60 atoms of carbon and preferably 5 to 38 atoms of carbon, an aryl group having 6 to 60 atoms of carbon, an aryl-alkyl (aralkyl) group or an alkyl-aryl (alkaryl) group having 7 to 60 atoms of carbon or the corresponding groups substituted by at least one atom of halogen), an alkoxyalkyl group of formula $R^5-O-R^6$ in which $R^5$ represents a hydrocarbon group, possibly substituted by at least one atom of halogen, having 1 to 60 atoms of carbon such as, for example, the hydrocarbon groups described above, and $R^6$ represents a divalent hydrocarbon group having 1 to 60 atoms of carbon such as, for example, an alkylene group having 1 to 60 atoms of carbon, an alkenylene group having 2 to 60 atoms of carbon and, most often, 2 to 38 atoms of carbon, a cyclo-alkylene group having 3 to 60 atoms of carbon and most often 5 to 38 atoms of carbon or an arylene group having 6 to 60 atoms of carbon and, most often, 6 to 38 atoms of carbon; $R^2$ can also represent a group of formula $R^5-CO-R^6-$ or a group of formula $R^5-CO-O-R^6-$, in which $R^5$ and $R^6$ have the definition given above, such as, for example, an alkoxycarbonyl-alkylene group or an alkylcarbonyloxyalkylene group; $R^2$ and $R^4$ can also form together with the atoms of carbon to which they are linked a ring, saturated or unsaturated, having for example 4 to 62 atoms of carbon.

The mono-epoxide compounds which are used most often are those in which $R^1$ and $R^3$ represent each an atom of hydrogen and preferably those in which $R^1$, $R^3$ and $R^4$ represent each an atom of hydrogen.

As an example of preferred mono-epoxide compounds, can be cited the compounds in which $R^1$, $R^3$ and $R^4$ represent each an atom of hydrogen and $R^2$ represents a substantially linear alkyl group having 4 to 34 atoms of carbon; a substantially linear alkoxyalkyl group of formula $R^5-O-R^6-$, an alkoxycarbonylalkylene group of formula $R^5-O-CO-R^6-$ or an alkylcarbonyloxyalkylene group of formula $R^5-CO-O-R^6-$ in which $R^5$ represents an alkyl group, substantially linear, having 1 to 37 atoms of carbon and preferably 1 to 25 atoms of carbon and $R^6$ represents an alkylene group, substantially linear, having 1 to 37 atoms of carbon and preferably 1 to 33 atoms of carbon, the sum of the atoms of carbon of $R^5$ and $R^6$ ranging most often from 2 to 38 and preferably from 4 to 34.

The following specific examples of mono-epoxide compounds can be cited:ethylene oxide, propylene oxide, 1,2-epoxy butane, 1,2-epoxy pentane, 1,2-epoxy hexane, 1,2-epoxy heptane, 1,2-epoxy octane, 1,2-epoxy nonane, 1,2-epoxy decane, 1,2-epoxy undecane, 1,2-epoxy dodecane, 1,2-epoxy tetradecane, 1,2-epoxy pentadecane, 1,2-epoxy hexadecane, 1,2-epoxy heptadecane, 1,2-epoxy octadecane, 1,2-epoxy nonadecane, 1,2-epoxy eicosane, 1,2-epoxy docosane, 1,2-epoxy tetracosane, 1,2-hexacosane, the epoxide polybutenes of average molecular mass (Mn) ranging from about 100 to about 1,000, 2,3-epoxy butane, 2,3-epoxy pentane, 2,3-epoxy hexane, 3,4-epoxy heptane, 2,3-epoxy octane, 3,4-epoxy octane, 3,4-epoxy decane, 9,10-epoxy octadecane, 3-ethoxy 1,2-epoxy propane, 3-propoxy 1,2-epoxy propane, 3-butoxy 1,2-epoxy propane, 3-pentyloxy 1,2-epoxy propane, 3-hexyloxy 1,2-epoxy propane, 3-heptyloxy 1,2-epoxy propane, 3-octyloxy 1,2-epoxy propane, 3-decyloxy 1,2-epoxy propane, 3-dodecyloxy 1,2-epoxy propane, 1-acetoxy 2,3-epoxy propane, 1-butyryloxy 2,3-epoxy propane, 1-lauroyloxy 2,3-epoxy propane, 3-myristoyloxy 1,2-epoxy propane, 3-palmitoyloxy 1,2-epoxy propane, 3-stearoyloxy 1,2-epoxy propane, the alkylic esters, for example methylic, ethylic, n-propylic, isopropylic, n-butylic, secbutylic, isobutylic, tertiobutylic, 2-ethyl hexylic and hexadecylic of the 3,4-epoxy butanoic, 4,5-epoxy pentanoic, 3,4-epoxy nonanoic, 10,11-epoxy undecanoic, 6,7-epoxy octadecanoic, 12,13-epoxy octadecanoic, 11,12-epoxy octadecanoic, 9,10-epoxy octadecanoic, 11,12-epoxy eicosanoic and 13,14-epoxy docosanoic acids, 1-chloro 2,3-epoxy propane, 2,3-epoxy 2-methyl butane, epoxycyclopentane, epoxycyclohexane, epoxycyclododecane, alphapineneoxide (2,7,7-trimethyl 3-oxa 4,1,1,0-tricyclo octane) and styrene oxide (phenyloxirane).

The following specific example of a mixture of epoxide compounds comprising poly-epoxides can be cited: the mixture of alkylic esters obtained by esterification of a mixture of epoxyacids resulting from the epoxidation of a mixture of ethylene-unsaturated fat acids.

The mixture of ethylene-unsaturated fat acids is for example a mixture comprising, in approximate proportions by weight given in table (I) hereafter, acids having 12 to 20 atoms of carbon in their molecule and containing saturated and unsaturated acids; this mixture is usually called olein.

general preferably utilized, such as for example a hydrocarbon solvent. The following non limitative examples of utilizable hydrocarbon solvents can be cited:benzene, toluene, xylene, ethylbenzene, cyclohexane, hexane or a mixture of hydrocarbons such as, for example, a hydrocarbon cut with a high boiling point such as a gas oil, a kerosine, or the commercial cut SOLVESSO 150 (190°–209°C.) containing 99% by weight of aromatic compounds. It is also possible to use mixtures of solvents, for example a mixture of xylenes.

The esterification or the polyesterification (condensation) reaction is usually carried out at a temperature ranging from about 0 to about 200.C, preferably from about 10 to about 180.C and, for example, from about 20 to about 150.C. It is generally performed under a normal pressure or under the pressure generated by the constituents of the mixture, but it is possible to operate under a pressure that is higher or, on the contrary, under a pressure that is lower than the atmospheric pressure.

The condensation between the acid anhydride and the epoxide is generally carried out by using such amounts of each one of these two compounds that the molar ratio epoxide/acid anhydride ranges from about 0.1:1 to about 2:1, preferably from about 0.3:1 to about 1.3:1 and for example, from about 0.9:1 to about 1.1:1.

The reaction duration usually ranges from about 30 minutes to about 24 hours and, for example, from about 1 to about 12 hours. This duration is preferably that which corresponds, within the chosen conditions, to a practically total disappearance of one of the reagents (epoxide or anhydride) utilized in the reaction.

The catalytic composition comprising titanium and phosphorus is usually added to the mixture of epoxide and anhydride in the diluted form (solution or dispersion) in a solvent that is preferably the same as that which is utilized for the reaction. It is also possible to add to the solution or dispersion of the catalytic composition in a liquid, which is preferably the solvent selected for performing the reaction, the epoxide and the anhydride to be reacted.

The amount of catalytic composition utilized, expressed in gram-atom of titanium per 100 moles of epoxide, usually ranges from about 0.05 to about 5% and preferably from about 0.1 to about 2%.

The polyester from the reaction, according to the invention, of an epoxide on a dicarboxylic acid anhydride is a compound which usually shows an average molecular mass of about 400 to about 50,000 and whose

TABLE I

| ACIDS | $C_{12}$* | $C_{14}$* | $C_{14.1}$ | $C_{15}$* | $C_{16}$* | $C_{16.1}$ | $C_{17.1}$ | $C_{18}$* | $C_{18.1}$ | $C_{18.2}$ | $C_{18.3}$ | $C_{20.1}$ |
|---|---|---|---|---|---|---|---|---|---|---|---|---|
| % wt. | 0.8 | 2.7 | 1.0 | 0.5 | 5.0 | 5.5 | 1.5 | 1.5 | 68.0 | 10.0 | 2.5 | 1.0 |

*saturated acids

In table (I) above $C_{p.1}$ represents acids with an ethylene-unsaturation, $C_{p.2}$ represents acids with 2 ethylene-unsaturations and $C_{p.3}$ represents acids with 3 ethylene-unsaturations (p is the number of atoms of carbon of the acid).

For esterifying the mixture of epoxyacids, a mixture of alcohols comprising in approximate proportions by weight about 95% of n-hexadecylic alcohol, 3% of n-octadecylic alcohol and 2% of alcohols having more than 18 atoms of carbon in their molecule is for example used.

The reaction between at least one epoxide and at least one carboxylic acid anhydride can be carried out in the presence or in the absence of a solvent. A solvent is in units from the epoxide and the anhydride are regularly alternate. Besides, the use of the catalytic composition of the present invention allows to reduce very strongly the homopolymerization of the epoxide in relation to what is obtained by using a tetraalkyl titanate such as, for example, tetrabutyl titanate, while maintaining a high reaction velocity, which also allows obtaining, in isoconditions, a relatively high conversion of the original product, as shown in the following examples.

These examples illustrate the invention without limiting the scope thereof. Examples 1 to 4 and 12 are given as a comparison.

EXAMPLE 1

(14.7 g $R^1$) 0.15 mole of maleic anhydride, (42.9 g) 0.15 mole of 1,2-epoxy hexadecane the oxirane index of which is 5.6%, 14.6 ml of xylene and 1.4 ml of a solution in the xylene of 50% by weight of tetrabutyl titanate of formula $Ti(OC_4H_9)_4$ ($2.25 \times 10^{-3}$ mole) serving as a titanium-based catalyst are introduced into a 100 ml-reactor fitted with a stirring system and a temperature regulation system.

The mixture obtained in the reactor is brought to 60° C. and maintained, under constant stirring, at this temperature for 8 hours. The reaction is followed by infrared (IR) spectrometry and by Gel Permeation Chromatography (G.P.C.). In infrared spectrometry, an ester band appears at 1,730 $cm^{-1}$ and the intensity of the carbonyl bands of the maleic anhydride decreases at 1,770 $cm^{-1}$ and 1,840 $cm^{-1}$ FIG. 1 shows the conversion percentage of each constituent according to the time in hours (measurings by G.P.C.). Curve A relates to the maleic anhydride and curve B to the 1,2-epoxy hexadecane. After 8 hours of reaction at 60° C., the conversion of the epoxide is 74% and that of the maleic anhydride is 68%. At this temperature, it can be noticed that the reaction is very slow.

EXAMPLE 2

Figure 2:
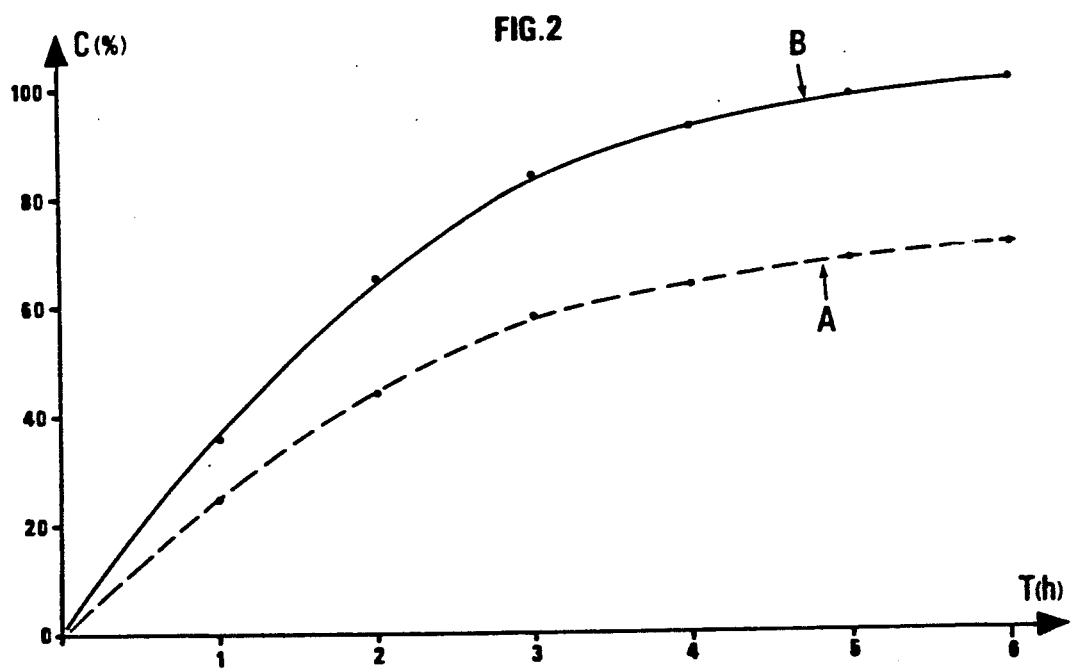

This example is performed under the same conditions as in example 1, but the temperature is set at 80° C. FIG. 2 shows the conversion percentage of each constituent according to the time in hours (measurings by G.P.C.). Curve A relates to the maleic anhydride and curve B to the 1,2-epoxy hexadecane. After 6 hours of reaction at 80° C, the conversion of the epoxide is 100% and that of the maleic anhydride is 74%. At this temperature, it can be noticed that the reaction is rather rapid, but the homopolymerization of the epoxide is rather high and largely exceeds 20% after 6 hours of reaction. Besides, FIG. 2 shows that the conversion of the epoxide is markedly quicker than that of the anhydride from the beginning of the reaction. The obtained polymer is not a perfectly alternating polymer.

EXAMPLE 3

This example is performed under the same conditions as in example 1, but while using as a catalyst 1.305 g ($2.25 \times 10^{-3}$ mole) of ammonium phosphate of formula $(HPO_4)^{2-}, 2(NR^8R^9R^{10}R^{11})^+$ in which the $R^8$, $R^9$, $R^{10}$, $R^{11}$ groups represent each a n-butyl group. This phosphate is obtained after 1 hour of reaction, in a methanolic medium, at room temperature, of one mole of phosphoric acid with two moles of ammonium tetrabutyl hydroxyde, followed by a total evaporation of the solvent. After 6 hours of reaction at 60° C., the conversion of the epoxide is 20% and that of the maleic anhydride is 4%. No significant formation of polymer can be noticed.

EXAMPLE 4

This example is performed under the same conditions as in example 1, but by using as a catalyst 1.52 g ($2.25 \times 10^{-3}$ mole) of an ammonium phosphate of formula $(R^7PO^3)^{2-}, 2(NR^8R^9R^{10}R^{11})+$ in which the $R^8$, $R^9$, $R^{10}$, $R^{11}$ groups represent each a n-butyl group and $R^7$ represents a dodecyl group. This salt is obtained in the same way as in example 3, but by replacing the phosphoric acid with dodecylphosphonic acid (marketed by the HOECHST Company under the name HOSTAPHAT OPS). After 6 hours of reaction at 60° C., the conversion of the epoxide is 21% and that of the maleic anhydride is 50%. The reaction, very incomplete, does not lead to a polymer.

EXAMPLE 5

(14.7 g) 0.15 mole of maleic anhydride, (42.9 g) 0.15 mole of 1,2-epoxy hexadecane the oxirane index of which is 5.6%, 14.6 ml of xylene and $2.25 \times 10^{-3}$ mole of a catalytic composition resulting from the equimolar mixing of the ammonium phosphate utilized in example 3 and tetrabutyl titanate are introduced into a 100 ml-reactor fitted with a stirring system and a temperature regulation system. This catalytic composition is prepared immediately before use by simply mixing together its constituents in 2 ml of xylene.

After 3 hours of reaction at 60° C., the conversion of the epoxide is 100% and that of the maleic anhydride is 95%. FIG. 3 shows the conversion percentage of each constituent according to the time in hours (measuring by G.P.C.). Curve A relates to the maleic anhydride and curve B to the 1,2-epoxy hexadecane. The polyester obtained has an average molecular mass, in relation to a calibration on polystyrene, of 3,450 and a polydispersity of 1.27. FIG. 3 shows that the conversions of the epoxide and the anhydride are, particularly during the first hours of the reaction, substantially equal at any time, which allows inferring the formation of a perfectly alternating polymer. The homopolymerization of the epoxide is low it does not exceed 5% after the 3 hour-reaction.

EXAMPLE 6

Example 5 is repeated but $1.12 \times 10^{-3}$ mole of the catalytic composition described in example 5 are used. After 6 hours of reaction at 60° C., the conversion of the epoxide is 100% and that of the maleic anhydride is 96%. FIG. 4 shows the conversion percentage of each constituent according to the time in hours (measurings by G.P.C.). Curve A relates to the maleic anhydride and curve B to the 1,2-epoxy hexadecane. Under these conditions, it can be seen that the reaction is fast and that the homopolymerization does not reach 5% after the 6 hour-reaction. The polyester obtained is a perfectly alternating polymer.

EXAMPLE 7

Example 5 is repeated but the maleic anhydride is replaced with phthalic anhydride and 20 ml of solvent are added to obtain a homogeneous mixture at the reaction temperature. After 6 hours of reaction at 80° C., the conversion of the epoxide is 100% and that of the phthali anhydride is 98%. FIG. 5 shows the conversion percentage of each constituent according to the time in hours (measurings by G.P.C.). Curve A relates to the phthalic anhydride and curve B to the 1,2-epoxy hexadecane. The polyester obtained has an average molecular mass, in relation to a calibration on polystyrene, of 2,335 and a polydispersity of 1.31.

EXAMPLE 8

Example 5 is repeated but the maleic anhydride is replaced with acetic anhydride. After 10 hours of reaction at 80° C., the conversion of each one of the reagents is substantially equal to 100%. In infrared spectrometry, an ester band appears at 1,730 $cm^{-1}$ and the carbonyl bands of the maleic anhydride disappear at 1,770 $cm^{-1}$ and 1,840 $cm^{-1}$. The infrared spectrum of the product obtained is in accordance with the expected ester spectrum.

EXAMPLE 9

Example 5 is repeated but the maleic anhydride is replaced with benzoic anhydride. After 10 hours of reaction at 80° C., the conversion of each one of the reagents is substantially equal to 100%. In infrared spectrometry, an ester band appears at 1,730 cm$^{-1}$ and the carbonyl bands of the maleic anhydride disappear at 1,770 cm$^{-1}$ and 1,840 cm$^{-1}$. The infrared spectrum of the obtained product is in accordance with the expected ester spectrum.

EXAMPLE 10

Example 5 is repeated but the maleic anhydride is replaced with lauric anhydride. After 10 hours of reaction at 80° C., the conversion of each one of the reagents is substantially equal to 100%. In infrared spectrometry, an ester band appears at 1,730 cm$^{-1}$ and the carbonyl bands of the maleic anhydride disappear at 1,770 cm$^{-1}$ and 1,840 cm$^{-1}$. The infrared spectrum of the obtained product is in accordance with the expected ester spectrum.

EXAMPLE 11

Figure 6:
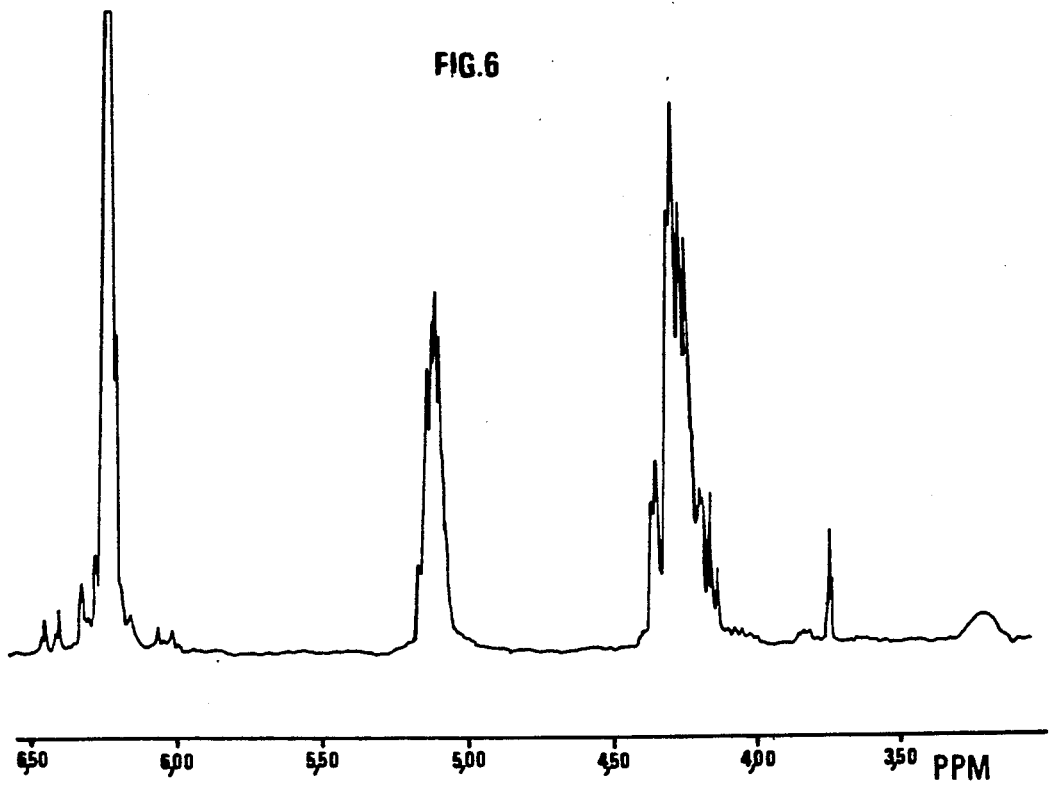

Example 5 is repeated but the 1,2-epoxy hexadecane is replaced with 1,2-epoxy butane. After 6 hours of reaction at 30° C., the conversion of each one of the reagents is substantially equal to 100%. In infrared spectrometry, an ester band appears at 1,730 cm$^{-1}$ and the carbonyl bands of the maleic anhydride disappear at 1,770 cm$^{-1}$ and 1,840 cm$^{-1}$. The N.M.R. spectrum (FIG. 6) of the obtained polyester shows:
- a peak centered at 6.25 ppm representing the two protons carried by the double maleate bond;
- a peak centered at 5.1 ppm representing the methyne proton from the epoxide;
- a peak centered at 4.25 ppm representing the two methylene protons from the epoxide.

No peak corresponding to ether protons stemming from the homopolymerization of the epoxide can be seen. The obtained polyester is perfectly alternating.

EXAMPLE 12

Figure 7:
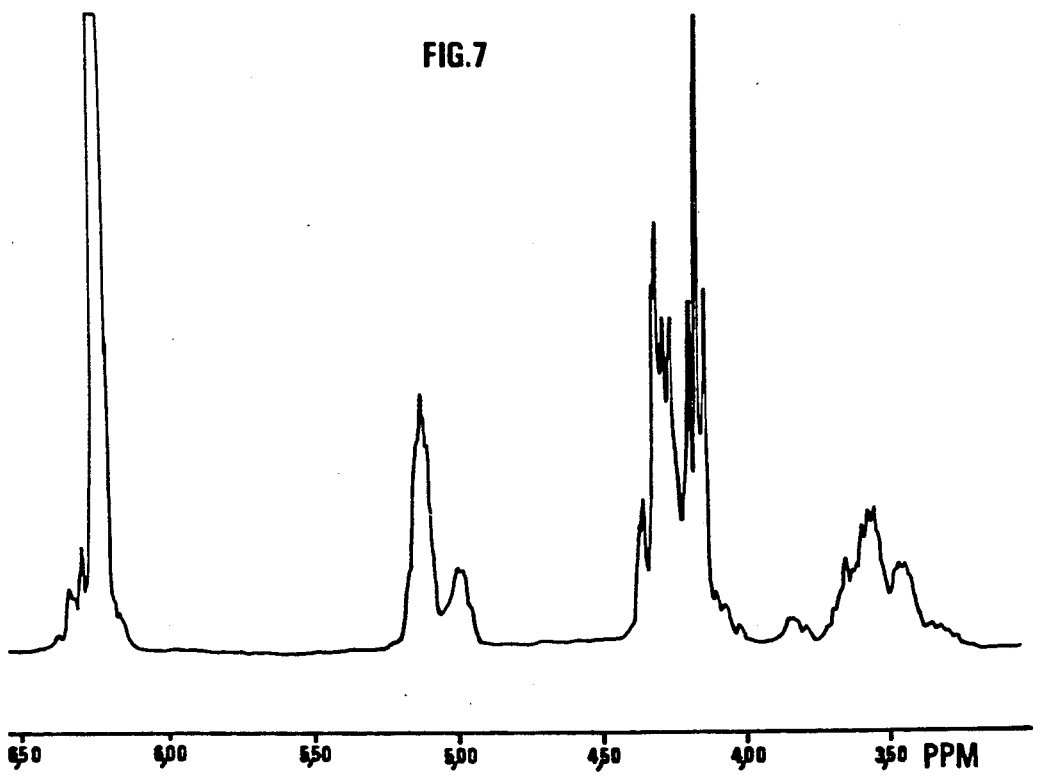

Example 1 is repeated but the 1,2-epoxy hexadecane is replaced with 1,2-epoxy butane. After 6 hours of reaction at 30° C., the conversion of the epoxide is substantially equal to 100%. That of the maleic anhydride is only 70%. In infrared spectrometry, an ester band appears at 1,730 cm$^{-1}$ and the carbonyl bands of the maleic anhydride partly disappear at 1,770 cm$^{-1}$ and 1,840 cm$^{-1}$ The N.M.R. spectrum (FIG. 7) of the obtained polyester shows:
- a peak centered at 6.25 ppm representing the two protons carried by the double maleate bond
- a peak centered at 5.1 ppm representing the methyne proton from the epoxide;
- a peak centered at 4.25 ppm representing the two methylene protons from the epoxide.

In addition, two peaks respectively centered at 4.95 and 3.55 ppm corresponding to oligo-ether sequences in the polyester can also be seen.

EXAMPLE 13

Example 5 is repeated but the 1,2-epoxy hexadecane is replaced with the 2-ethyl hexylic ester of 9,10-epoxy octadecanoic acid and $4.5 \times 10^{-3}$ moles of the catalytic composition described in example 5 are used. After 10 hours of reaction at 80° C., the conversion of each one of the reagents is substantially equal to 100%. In infrared spectrometry, an ester band appears at 1,730 cm$^{-1}$ and the carbonyl bands of the maleic anhydride disappear at 1,770 cm$^{-1}$ and at 1,840 cm$^{-1}$.

EXAMPLE 14

Example 5 is repeated but the 1,2-epoxy hexadecane is replaced with 1,2-epoxy cyclododecene and $4.5—10^{-3}$ moles of the catalytic composition described in example 5 are used. In infrared spectrometry, an ester band appears at 1,730 cm$^{-1}$ and the carbonyl bands of the maleic anhydride disappear at 1,770 cm$^{-1}$ and at 1,840 cm$^{-1}$. After 6 hours of reaction at 80° C., the conversion of the epoxide is 100% and that of the maleic anhydride is 97%. FIG. 8 shows the conversion percentage of each constituent according to the time in hours (G.P.C. measuring). Curve A relates to the maleic anhydride and curve B to the 1,2-epoxy cyclododecene. The obtained polyester has an average molecular mass, in relation to a calibration on polystyrene, of 2,565 and a polydispersity of 1.1.

EXAMPLE 15

Example 13 is repeated but the maleic anhydride is replaced with acetic anhydride. After 19 hours of reaction at 80° C., the conversion of each one of the reagents is substantially equal to 100%. The obtained infrared spectrum is in accordance with the expected acetate spectrum.

We claim:

1. A catalytic composition comprising titanium and phosphorus, prepared by a process comprising contacting at least one titanate of formula (I):

$$Ti(OR)_4 \qquad (I)$$

in which each one of the R groups independently represents a hydrocarbon group having 1 to 10 atoms of carbon, with at least one quaternary "onium" salt of an acid selected from the group consisting of phosphoric acid of formula H$_3$PO$_4$ and the phosphoric acids of general formula (II):

$$R^7H_2PO_3 \qquad (II)$$

in which R$^7$ is a hydrocarbon group having 1 to 38 atoms of carbon, and whose quaternary "onium" remainder is a remainder of formula (III):

$$(R^8R^9R^{10}R^{11}M)^+ \qquad (III)$$

in which M is an element from group VA of the periodic table of elements and R$^8$, R$^9$, R$^{10}$ and R$^{11}$, are each independently an atom of hydrogen or a hydrocarbon group, optionally substituted by a hydroxyl group, having 1 to 38 atoms of carbon.

2. A composition according to claim 1 wherein the quaternary "onium" remainder is a remainder of general formula (III) in which M represents an atom of nitrogen or of phosphorus.

3. A composition according to claim 1 wherein the quaternary "onium" salt is a phosphoric acid salt having per in its molecule 2,3 or 4 atoms from group VA of the periodic table of elements.

4. A composition according to claim 1 wherein the quaternary "onium" salt is a phosphonic acid salt of general formula (II) having in its molecule 2 or 3 atoms from group VA of the periodic table of elements.

5. A composition according to claim 1, wherein the titanate is a titanate of formula (I) in which each one of the R groups independently represents a linear or branched alkyl group.

6. A composition according to claim 1 wherein the titanate is contacted with the quaternary "onium" salt in a liquid medium, for a duration ranging from about 1 to about 60 minutes, at a temperature ranging from about 0° to about 100° C. and with a molar ratio titanate/"onium" salt ranging from about 0.5:1 to about 2:1.

7. A composition according to claim 1, wherein the "onium" remainder is tetramethylonium, tetraethylonium, tetrapropylonium, tetrabutylonium, tetraphenylonium, tetrabenzylonium, methyltributylonium, methyltriethylonium, methyltriphenylonium, butyltriphenylonium, ethyltriphenylonium, benzyltrimethylonium, benzyltributylonium, benzyltriphenylonium, phenyltrimethylonium, octadecyltrimethylonium, naphtyltrimethylonium, tolyltrimethylonium, dimethyldioctadecylonium, dimethyldihexadecylonium, dioctadecylhydroxyethylmethylonium, decylhydroxypropylmethylonium or tricaprylylmethylonium.

8. A composition according to claim 1, wherein the R groups are independently methyl, ethyl, n-propyl, isopropyl, n-butyl, isobutyl, tertiobutyl, and 1-methyl propyl.

* * * * *